(12) United States Patent
Billington et al.

(10) Patent No.: US 6,963,936 B2
(45) Date of Patent: Nov. 8, 2005

(54) NETWORK-ATTACHED PERIPHERAL APPLIANCE

(75) Inventors: Corey Billington, San Jose, CA (US); Chris Bradley, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/633,467

(22) Filed: Jul. 31, 2003

(65) Prior Publication Data

US 2004/0024933 A1 Feb. 5, 2004

Related U.S. Application Data

(63) Continuation-in-part of application No. 09/907,212, filed on Jul. 16, 2001.

(51) Int. Cl.[7] ............................................... G06F 3/00
(52) U.S. Cl. ................... 710/62; 347/198; 358/474; 358/498; 399/80; 399/81; 399/411
(58) Field of Search ..................... 710/62; 347/198; 358/498, 474; 399/80, 81, 411

(56) References Cited

U.S. PATENT DOCUMENTS

| | | |
|---|---|---|
| 5,099,346 A | 3/1992 | Lee et al. |
| 5,247,380 A | 9/1993 | Lee et al. |
| 5,421,012 A | 5/1995 | Khoyi et al. |
| 5,596,723 A | 1/1997 | Romohr |
| 5,945,981 A | 8/1999 | Paull et al. |
| 5,968,147 A | 10/1999 | Polfer et al. |
| 6,052,380 A | 4/2000 | Bell |
| 6,081,356 A | 6/2000 | Branc et al. |
| 6,160,642 A * | 12/2000 | Mui et al. .................... 358/498 |
| 6,181,893 B1 * | 1/2001 | Collard et al. ................ 399/80 |
| 6,185,010 B1 * | 2/2001 | Watanabe .................... 358/474 |
| 6,252,614 B1 | 6/2001 | Mullin |
| 6,255,800 B1 | 7/2001 | Bork |
| 6,304,250 B1 | 10/2001 | Yang et al. |
| 6,327,613 B1 | 12/2001 | Goshey et al. |
| 6,473,783 B2 | 10/2002 | Goshey et al. |
| 6,476,795 B1 | 11/2002 | Derocher et al. |
| 2001/0016889 A1 | 8/2001 | Kikinis |
| 2002/0029311 A1 | 3/2002 | Joyeau et al. |
| 2002/0031099 A1 | 3/2002 | Cookman et al. |
| 2002/0042851 A1 | 4/2002 | Lochner et al. |
| 2002/0054321 A1 | 5/2002 | Kikuchi |
| 2002/0077067 A1 | 6/2002 | Lochner et al. |
| 2002/0085361 A1 | 7/2002 | Wachel |
| 2002/0091826 A1 | 7/2002 | Corneau et al. |
| 2002/0138548 A1 | 9/2002 | Neebe et al. |
| 2002/0194180 A1 | 12/2002 | Alsop et al. |
| 2003/0005186 A1 | 1/2003 | Gough |

* cited by examiner

Primary Examiner—A. Elamin

(57) ABSTRACT

A network-attached peripheral appliance (NAPA), including a powered peripheral node (PPN), enabling connection of peripheral devices to a network without a computer at the node. The PPN further comprises a data connection enabling data communication between the appliance and a network, and is configured to accommodate data connection of a plurality of peripheral devices at the appliance, and a power supply configured to provide power to said plurality of peripheral devices. The appliance can include a case which can carry two or more peripheral devices, which are shareable between clients on the network via the NAPA.

31 Claims, 4 Drawing Sheets

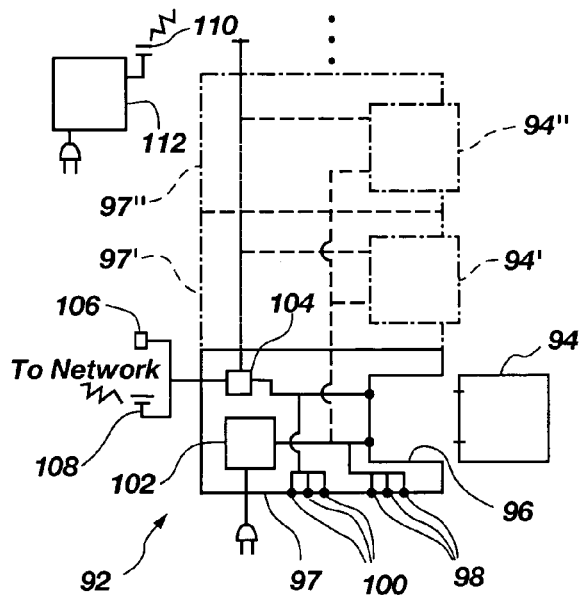
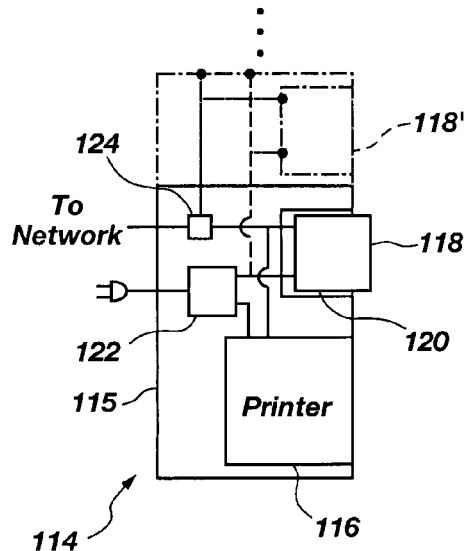
Fig. 9                    Fig. 10
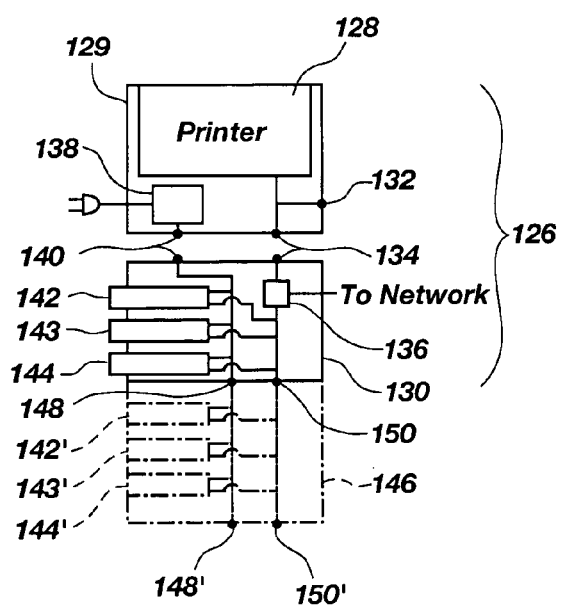
Fig. 11

NETWORK-ATTACHED PERIPHERAL APPLIANCE

This application is a continuation-in-part of U.S. application Ser. No. 09/907,212 filed Jul. 16, 2001, the disclosure of which is incorporated herein by reference.

BACKGROUND

The invention relates to information systems. More particularly, the invention relates to methods and devices used to share peripheral devices between a plurality of clients in a network environment.

Conventionally, in a network environment including a server and a plurality of clients, one of two strategies is usually adopted to provide client workstations with peripheral devices. These peripheral devices typically include peripherals such as printers, scanners, other image capture and projection devices, data storage devices such as floppy drives, CD/CDRW/and/or DVD drives, zip drives, etc. A first option is to provide each client node with a set of peripherals which are located at the workstation computer of the client node. This would include all peripherals that the user(s) of that workstation might need, even if just from time to time. This can be an expensive proposition, especially when considering the waste of resources in providing peripherals that are only occasionally used by each individual user.

The second option is to provide for client users to share peripherals over a network. A local area network (LAN), or other form of network can be configured to allow multiple users access to a peripheral device. This is very common in the case of printers (and plotters), for example. In that example, a LAN card is usually provided at the printer. Typically, this is done by connecting the printer to the network via a dedicated printer connection device that includes a LAN card or other connection logic. With such a dedicated device typically including a LAN card or other network data communication logic, the printer and connection device comprises a network node, and the printer can be used by a plurality of clients on the network.

However, in the case of disk drives, zip drives, CD/CDR/DVD drives, scanners, floppy drives, USB and FireWire hubs with their connected devices, etc., to be shared, conventional practice is to provide a computer (such as a P.C.) at a node, and connect all the desired shared peripherals to this computer. The computer itself may not even be used, except for hosting the attached peripherals. Indeed, sporadic use of the shared peripherals by other persons would likely be distracting to a user attempting to make data processing/computational use of the computer on a continuing basis. What may be even more problematic in some circumstances is that the physical space requirements of using a computer host are much larger than what is actually needed for the peripherals to be connected. In some enterprises, a room, cubicle, or other space, is dedicated to this host computer and the peripherals it supports. Space efficiency represents cost savings, as typically some cost attaches to each square foot of floor space (or each volume unit) within an office or other facility. Therefore this second solution involves not only the cost of the extra computer, but also the cost of providing the footprint of another workstation that is either rarely used or used less profitably because the user of that workstation is subjected to interruptions, typically due to other network users coming there to use the shared peripheral devices at that node.

SUMMARY

The invention provides a network-attached peripheral appliance (NAPA), which creates a powered peripheral node (PPN) on a network. The NAPA can include a data connection enabling data communication between the appliance and a network; and, the data connection can be configured to accommodate connection of, and data communication with, a plurality of peripheral devices at the appliance. Whereby, peripheral devices connected at the appliance can be in data communication with clients on the network. A power supply configured to provide power to said plurality of peripheral devices is included; whereby the plurality of peripheral devices can be powered by the power supply. Thus a PPN is enabled, allowing shared use of the peripheral devices connected to the appliance by clients on the network. The NAPA can include at least one case configured to carry and operatively support the data connection, power supply, and the plurality of connected peripherals.

This can eliminate the need for a computer to support the peripheral devices at a network node. It can reduce the need for external peripherals with their own power supplies. And further, it can eliminate the need for network card/connection devices for each peripheral device. Other features and advantages will be apparent with reference to the following detailed description of particular examples of embodiments of the invention, taken in conjunction with the accompanying drawings. These are illustrative of some possible ways the invention can be implemented, but are not intended to be a complete description of all the possibilities.

BRIEF DESCRIPTION OF THE DRAWING FIGURES

FIG. 1 is a perspective view, partially exploded, of a network-attached peripheral appliance providing a powered peripheral node, according to an embodiment of the invention, configured to fit within a footprint of a printer, with other peripherals attachable via data ports or incorporatable by sliding into bays as illustrated by a peripheral device shown removed from a bay and slideably receivable therein;

FIG. 9 is a schematic block diagram illustrating a NAPA/PPN in accordance with an embodiment of the invention;

FIG. 10 is a schematic block diagram illustrating a NAPA/PPN in accordance with an embodiment of the invention;

FIG. 11 is a schematic block diagram illustrating a NAPA/PPN in accordance with an embodiment of the invention.

DETAILED DESCRIPTION

Figure 1:
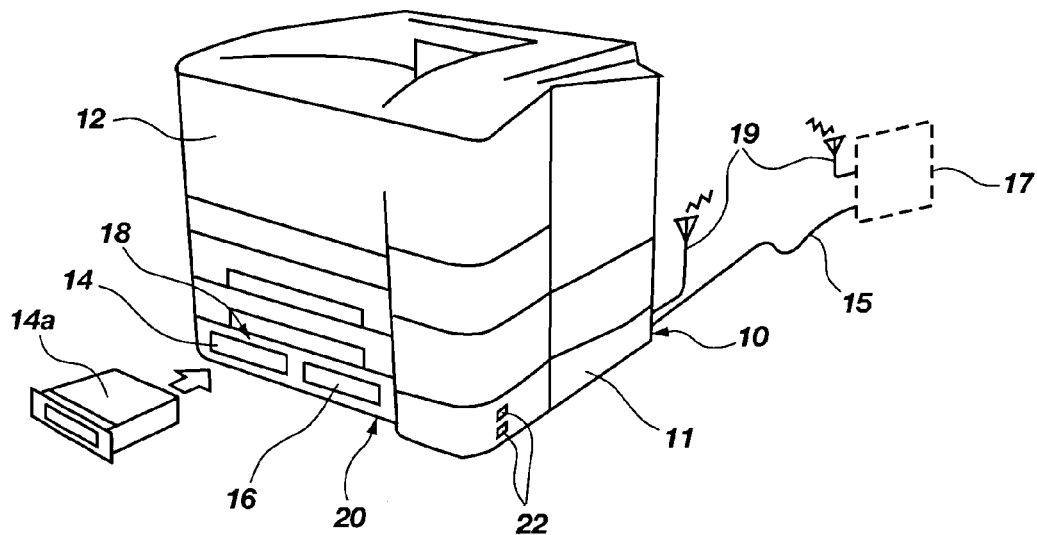

With reference to FIG. 1 of the exemplary drawings, an example embodiment of a network-attached peripheral appliance (NAPA) 10 is configured to provide a powered peripheral node (PPN) configured to fit within a footprint of a printer 12. In this embodiment a case (housing, enclosure) 11 of the NAPA is configured to connect to the bottom of the printer 12 to form an integral unit, which in one embodiment can be picked up and transported, etc. The NAPA comprises a power and a data connection for each of a plurality of peripherals 14, 16 connected thereto.

In the illustrated embodiment, in bays 18, 20 embodied in the case 11 of the NAPA 10 receive peripherals 14 and 16, such as a data storage drive 14. Power and data connectors of conventional configuration (not shown) can be provided, and power and data connection of the peripheral devices can be made in a conventional way. For example the connector arrangements for power and data can be essentially as would be provided when installing the peripherals in a case of a PC. In another embodiment, connections can be made by providing a standardized connector scheme, in which power and data connections are made by simply slipping a peripheral device into the slot defined by a bay. In the later embodiment, one example of implementation is to provide connectors at a back of the peripheral device, and at a back wall of the bay. These connectors mate to provide the connections when the peripheral device is inserted in the bay. This arrangement is conventionally provided in connection with "swappable" peripheral devices, e.g., 14a.

In one embodiment the connectors (not shown) can be configured to perform a "key" function (as more fully described below) allowing connection of compatible devices having a compatible connector configuration, and disallowing connection of other devices. This can be done through the shape of the connectors themselves, or can be done by way of position of the connectors, or a combination of both.

The peripheral devices 14, 16 accommodated by the NAPA share a power supply with the printer 12, as well as a data connection (15 or 19) to a network 17. Thus a powered peripheral node is established on the network allowing data connection and power connection of peripheral devices without need for a PC at the network node.

The network-attached peripheral appliance 10 can further comprise additional data connections facilitating data connection of additional devices at the PPN, for example USB data hub ports 22. The NAPA system can also include ports for connection via other bus types, such as FireWire ports (not shown) for example. Again, such ports allow other peripherals to be connected to the network via the NAPA at this location. For example, scanners, cameras, additional external data storage and playback drives, additional connector hubs, etc. can be data-connected to the network through such a data connector hub (22). Each such peripheral device can have a power source different from that of the network-attached peripheral appliance. In one embodiment however, power sockets (not shown) can be provided to allow convenient power connection of these additional peripherals. Such power sockets can be configured for accepting only standardized connectors for the correct voltage/current for the peripheral. For example, an external drive may be configured for 110 v AC power while another device may be configured for 12 volts DC power, or 5 volts DC, etc. and the connectors can be configured to prevent an inadvertent connection to the wrong voltage DC/AC/current power source. The network-attached peripheral appliance can have its own power supply (not shown but conventional and within the case 11), providing power to the connected peripherals, and to these last-mentioned power connections if such are provided. In another embodiment it can use a power supply of the printer 12.

This system 10 can be used in a small network or a large enterprise network having many clients connected. In the latter case it is contemplated that the NAPA can support shared peripheral devices for a workgroup, for example. A plurality of such NAPAs can be provided, each saving the cost of having to provide a multiplicity of peripheral devices at individual network client workstations.

In one embodiment, connection to a network 17 can comprise a cabled connection 15. This can be via a LAN card (not shown) or other connection logic hardware incorporated in the NAPA which establishes it as a network node, and allows connected peripheral devices to have network addresses. The printer 12 and the peripheral devices 14, 16 and any other devices connected by the data connection(s) 22 are then coupled into the network by means of and at the single PPN established by the NAPA. This illustrated arrangement allows convenient placement of peripheral devices adjacent the printer for convenient access by a plurality of network users.

In another embodiment, the connection to the network 17 can be via a wireless connection 19. For example, a low power radio frequency device can be used, which eliminates the need for a cable connection 15. This is convenient in that the printer 12 and NAPA, with attached (or embedded and attached) peripherals can be located anywhere the wireless connection can be made. Wireless connection schemes and equipment are well known and commercially available. For example, WiFi and Bluetooth protocol devices can be used, and other schemes will undoubtedly be developed over time. For example, wireless USB connectivity is contemplated.

Figure 2:
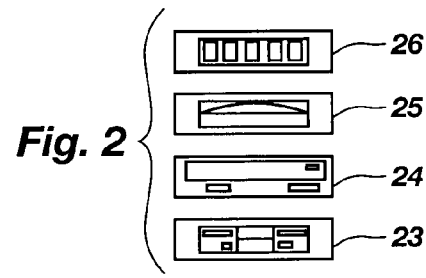
FIG. 2 is a front view of a number of peripheral devices configurable for use at a PPN according to an embodiment of the invention such as that provided by the embodiment of FIG. 1.

With reference to FIG. 2, some exemplary embodiments of peripherals which can be incorporated in the network-attached peripheral appliance are illustrated. For example, this can be done by installation in one of the bays 18, 20, or the peripherals can be separately connected through USB or FireWire ports 22. A floppy drive 23; a CD, CDR/W, or DVD drive 24; a ZIP drive 25; and/or a USB hub 26 (enabling connection of even more devices) can be incorporated in the PPN.

Figure 3:
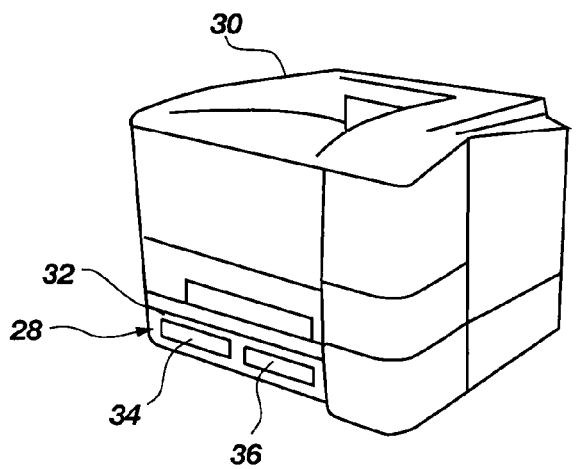
FIG. 3 is a perspective view of a NAPA providing a PPN according to an embodiment of the invention, wherein a tray carrying one or more peripheral devices is configured to be received in an auxiliary paper tray of a printer, the tray being shown inserted therein.
Figure 3A:
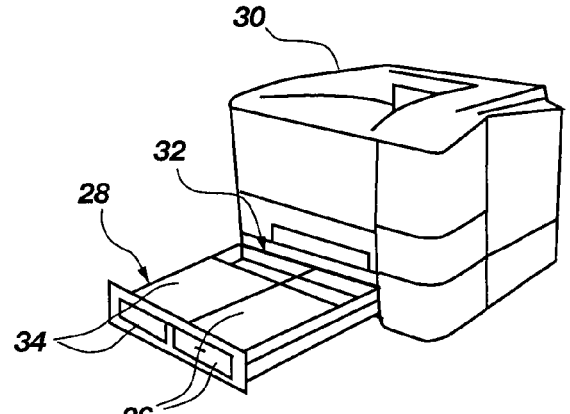
FIG. 3A is a perspective view of the embodiment of FIG. 3, with the network attachable peripheral appliance peripheral tray pulled out from the auxiliary paper tray and showing the peripheral devices carried therein.

Turning now to another embodiment, FIGS. 3 and 3A illustrate a system 10 wherein the network-attached peripheral appliance 28 can be integrated with a printer 30 (again, the most common peripheral shared among clients on a network). The network-attached peripheral appliance is configured to fit within a case 31 of the printer, and in the embodiment shown includes a tray which conveniently slips into an auxiliary paper tray slot 32. Power and data connections (not shown) are made within the case of the printer. These power and data connections are made by providing at least one connector for power and data connections; having, for example, male and female parts, each of which is aligned and joined together as the tray/module 28 facilitating the PPN and network-attached peripheral appliance is inserted into the paper tray slot. With the tray fully inserted in the paper tray slot, it is automatically aligned, seated, and engaged, as the connectors are aligned and pushed together to make the power and data connections.

In one embodiment, 1) a network data connection, comprising a LAN card or other network connection logic; and, 2) a power supply, are located within the printer case 31. Thus the printer is able to be network-connected. Peripheral data and power connections, which provide power and provide data communication to the devices to and from the network via the LAN card or other data communication logic within the printer case, are made when the tray is installed in the printer case. Thus, the peripherals 34,36 in the tray are also able to be network connected and also located at a network node when the tray is installed in the printer case.

This embodiment of FIGS. 3, 3A is advantageous in that no extra space is required for the network-attached peripheral appliance 28. Printer functions requiring use of the auxiliary paper tray (not shown) can be implemented by simply substituting the auxiliary paper tray for the tray enabling the network-attached peripheral appliance, as needed. Since need for the auxiliary paper tray is usually rather infrequent, just as the need for the peripherals 34, 36 incorporated in the network-attached peripheral appliance is relatively infrequent, this will not typically constitute a great inconvenience. Moreover, interchanging the peripheral devices in the tray appliance is facilitated, as they are easily accessible from an open top of the tray enabling network-attached peripheral appliance as well as the front of the network-attached peripheral appliance in the illustrated embodiment. Also, the users will determine whether the peripherals of the network-attached peripheral appliance tray or the auxiliary paper tray is more frequently used, and which should ordinarily be left in the printer 30 in this embodiment. If the printer is moved to another location where the peripherals are not usually required, the auxiliary paper tray can be used and the tray of the network-attached peripheral appliance will only be inserted on the more rare occasions when the peripherals 34, 36 are needed.

Figure 4:
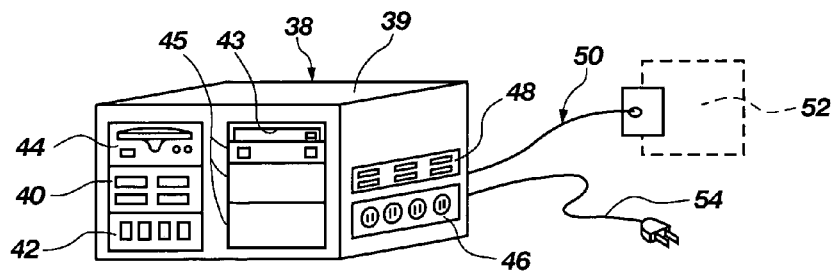
FIG. 4 is a perspective view, partly schematic, of a stand-alone PPN/NAPA according to an embodiment of the invention, having data bus ports for connection of peripherals, as well as power supply connectors for connection to a power supply at various standard voltage and current outputs, and one or more bays configured to receive peripheral devices.

Turning to FIG. 4, in another embodiment the network-attached peripheral appliance 38 can be configured as a separate unit in its own case 39. It can incorporate a power supply, a LAN card (or other network data communication logic), and can include a data bus and data ports. Examples include a FireWire port hub 40 and USB port hub 42 in the illustrated example. The case can accommodate other peripherals, for example a zip drive 44. A bay 45 or multiple bays can be provided to accommodate one or more additional peripherals in one embodiment, for example a disk drive 43. The bay(s) can be configured for a "swappable" peripheral, or a more permanent installation. Additionally, a power connector 46 with multiple power connections can be incorporated for convenient connection of peripheral devices to the network-attached peripheral appliance without having to get power from a separate AC power socket. Connectors 48 for other DC power supply voltages, such as those described above, can also be provided. A network connection cable 50 provides connection of the NAPA's data bus via data connection logic of some type to the network 52, and a power cord 54 enables connection of the NAPA's power supply to a standard 110 v AC wall outlet.

As will be appreciated, in use the network-attached peripheral appliance 38 is connected to the network 52, and its power supply is connected to a power source. The peripherals are in turn connected to the network-attached peripheral appliance, and are then data connected to the network. These peripherals can then be powered directly from the network-attached peripheral appliance power supply as well. The connected peripherals' network address will be at a PPN created by the connected NAPA.

Figure 5:
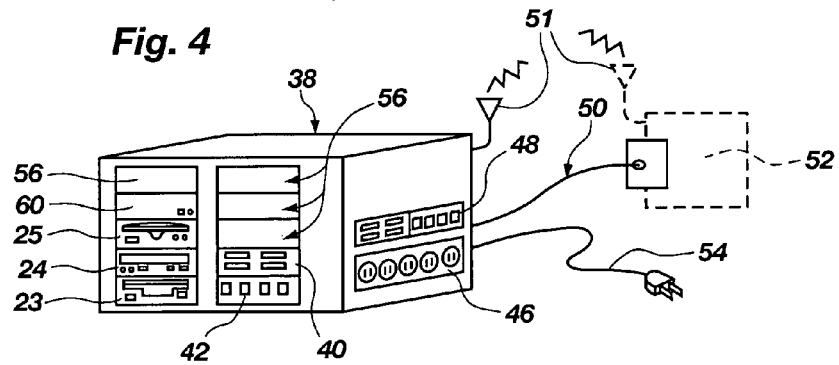
FIG. 5 is a perspective view, partly schematic, of another standalone example according to an embodiment of the invention wherein bays or slots are provided to receive peripherals, as well as the data and power connections, similar to those of the device illustrated in FIG. 4.

With reference now to FIG. 5, in another embodiment, the network-attached peripheral appliance 38 can have the elements and functionality just described, e.g., having data bus ports 40, 42, and power connectors 46, 48. A plurality of additional slots or bays 56 are provided for accommodation of additional peripherals, such as additional disk drives 60, floppy drives 23, zip drives 25, CD/CDR/DVD drives 24, and additional data hubs, if required, such as USB hubs 42 and/or FireWire ports 40, or connectors for other bus types. Again, a connection to a network 52 is provided, for example via a LAN card (not shown), along with a power supply (not shown), and data and power connection capability are thereby provided. Peripherals (e.g. 23, 24, 25, 56, 60) connected to the network-attached peripheral appliance 38 can share these resources. The network connection can be a conventional cabeled connector 50; or can be a wireless connection 51. The NAPA can include an RF, infrared, or other transponder in the latter case. This transponder cooperates with a similar transponder connected to the network.

Figure 6:
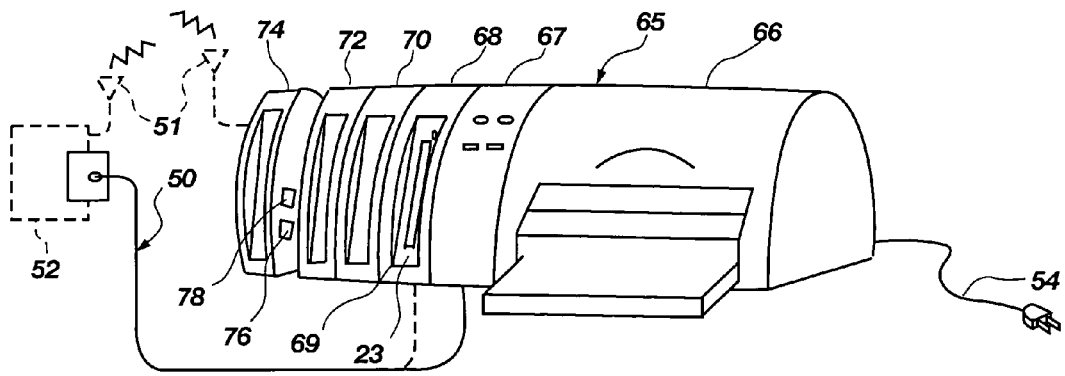
FIG. 6 is a perspective view, partially exploded, and partly schematic, of another example according to an embodiment of the invention, comprising one or a plurality of modules which attach to a side of a case of a printer.

Turning to FIG. 6, in another embodiment a network-attached peripheral appliance 65 is configured so as to include a module 68 connectable to a side of a printer 66. As alluded to above, a printer is the most commonly shared peripheral in a typical network environment, and thus it is advantageous to incorporate other peripherals at that location. In the illustrated embodiment, a network-attached peripheral appliance module is, 68, e.g., removably connectable to the printer; and, it can share a power supply with the printer, i.e. the printer's power supply. A data connection to the network 52 can also be shared. The NAPA can be made modular, so that if additional peripherals are added, they can be added by simply snapping on additional modules 70, 72, and 74. Power and data connectors 76, 78 are configured on two opposite surfaces of the modules of the modular NAPA, so that the power and data connections are automatically made, in a parallel way, as the modules are connected (stacked) in the order a user selects.

In one embodiment, the NAPA 65 can further comprise a LAN card or other network connection logic (not shown). Connecting a module 68 enabling a network-attached peripheral appliance makes the printer 66 also network-enabled. This is a convenient solution to the problem of configuring a printer (configured for connection to a single PC), so that it is transformed into a networked device. In another embodiment, the printer itself can be USB or other data-bus enabled, and therefore can be data connected to the network 52 via such a data bus in turn connected to the NAPA network connection logic (e.g., a LAN card in one of the modules), just as the other connected peripherals are thus connected to the network. If the network connection uses another protocol, a translation can be provided.

For example, in one embodiment the first module 68 includes a LAN card or other network connection hardware (not shown), and a bay accommodating a peripheral of choice, e.g., a data storage drive 23. With the module 68 connected to the printer, it is also network-enabled. Other modules 70, 72, 74 then can be added, and share the same network connection 50 or 51. All the attached modules can share the power supply (not shown) used by the printer.

In another embodiment, the LAN card (or other network connection enabling hardware) is provided within the printer 66 housing. In this later case the modules are completely interchangeable, and a first module connected e.g. 68 does not need to have a LAN card or the like.

Moreover, the modules 70, 72, 74 can be pre-packaged, with a peripheral in each. In one embodiment, one or more modules 68 can comprise bays 69 configured for accommodating peripherals of choice. In either case, a user, enterprise manager, etc. can purchase a printer 66 and the peripherals desired for a particular location and directly snap them together or install the desired peripherals in the bay(s) and snap the respective bays together. In the embodiment where at least one module comprises a bay, the peripheral can be switched out at a later time if desired. In another embodiment, the switch-out is accomplished by switching out the module. As can be appreciated, if a module includes a LAN card, a power supply, etc., providing a bay and the ability to switch out the peripheral and keep the module is desirable.

In one embodiment, the data and power connections e.g., 76, 78 can be configured so that the position of the module with a LAN card or equivalent is not important. In other words, the modules are connected to a common data bus, which is connected to the LAN card in one of them, which in turn is connectable to a network 52. This can be via a cable 50 or a wireless connection 51. In the later case, one module can include the wireless connection at the PPN comprising the NAPA 65 and supported peripherals in the modules 68, 70, etc. In another embodiment the wireless connection can be included within the housing of the printer 66.

In the illustrated embodiment it will be appreciated that considerable flexibility in hardware arrangement is inherent. Moreover, in one embodiment the NAPA 65 can be located physically entirely within the housing of the printer 66, with the peripherals being connected thereto in a modular way by connecting modules (68, 70, 72, 74 . . . etc.). In another embodiment, the hardware comprising the NAPA can be shared between the printer and one or more modules, for example the power supply being within the printer case, a LAN card or other network connection logic in a module, and in the case of a wireless connection, 51 that can be located in the same module, e.g. 74, as the LAN card, or another module. In a cabled connection 50 the data connection can be through the printer case, and shared with the printer. In another embodiment the printer can be an add on, which gets power and a network data connection from a NAPA module case e.g. 68, or a dedicated NAPA module 67; either way, a module to which the printer case is connected. More details concerning various possible configurations are given in examples set forth below.

Figure 7:
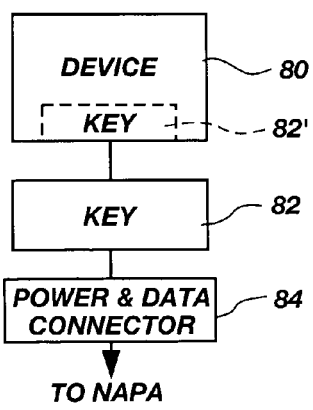
FIG. 7 is a block diagram illustrating embodiments of a "key" enabling (or disabling) connection of a peripheral device to a NAPA in accordance with an embodiment of the invention.

With reference to FIG. 7, more detail concerning the concept of a "key" will be given. In one embodiment a device 80 to be connected to the NAPA (not shown) has an electronic key 82 which can be an embedded system detected by the NAPA before a full connection is enabled, e.g. via a power and data connector 84 connecting to the NAPA's data and power connections. In another embodiment, the key can be a device that acts as a switch, enabling connection only if it detects a compatible power supply, for example, from a device 80 side of the connection. In one embodiment the key 82' can be incorporated entirely in the device 80, and in one embodiment can be primarily embodied in software. In another embodiment it is implemented in firmware, and in another embodiment can be a separate key device within the case of the device 80 or attached between the device and the NAPA. In the later embodiment the "key" can further comprise a power conversion power supply and can incorporate a data translator, to enable connection of an otherwise incompatible device to the NAPA.

Figure 7A:
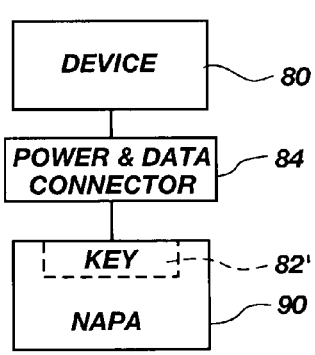
FIG. 7A is a block diagram illustrating another example of a key in a NAPA in accordance with an embodiment of the invention.

With reference to FIG. 7A, in another embodiment the "key" 82" is embodied on the NAPA 90 side of the connection. Here, compatibility of the peripheral 80 is determined by software or firmware, or hardware, etc. embodied in the NAPA; or, otherwise, the connection of the peripheral device is allowed or disallowed by virtue of the key embodied in the NAPA.

Figure 8:
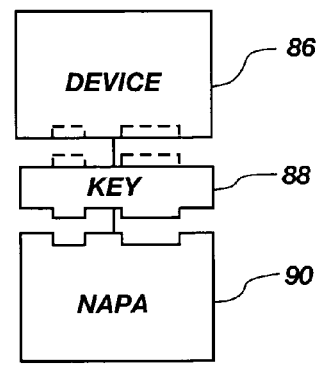
FIG. 8 is a block diagram illustrating another example of a key usable with the NAPA in accordance with an embodiment of the invention.

With reference to FIG. 8, in another embodiment a system can comprise peripheral device 86, and a physical key 88, which allows connection to the NAPA 90. In this embodiment it is the compatibility of the case, bay, connector, etc. which physically allows or disallows connection of the peripheral to the NAPA. In these physical "key" embodiments, as well as the above-mentioned electronic key embodiments of FIGS. 7, 7a, connection of compatible devices is facilitated, while connection of incompatible devices is discouraged/disallowed. In this way, the power supply of the NAPA can be protected, as can be non-compatible peripheral devices which otherwise might be damaged by erroneous connection to the NAPA.

Also, with reference to FIGS. 7, 7A, 8, the concept of a key 82, 88, for example, allows convenient bundling of related compatible products by a manufacturer, while discouraging connection of other manufacturer's products. This can give an advantage in that it can enable a manufacturer to have a measure of control over the quality of the performance of the NAPA and connected devices. This can give a purchaser a measure of confidence that the connected devices will be compatible, and the system will work well.

With reference now to FIGS. 9–15, a number of different configurations for implementation of a PPN by means of the NAPA are possible, and a few examples are given to illustrate further details. Specifically, as shown in FIG. 9, the NAPA 92 can be a stand-alone unit (such as those discussed above with reference to FIGS. 4 and 5 for example). The NAPA shown in FIG. 9 can accommodate connection of one or more peripherals 94, 94' 94". This can be by way of one or more bays 96, or otherwise accommodating the peripheral(s) in the case 97 of the NAPA. Also, as discussed, power connections 98 and data connections 100 can be provided to accommodate connection of one or more peripherals (not shown) without incorporating them within the case. As will be appreciated, a power supply 102 and a LAN card or other logic/processor 104 to enable data connection of the one or more connected peripherals 94 are provided within a case of the NAPA in this embodiment. The case is provided as large as required, e.g., 97', 97", to accommodate additional peripherals e.g, 94', 94".

As discussed above, the connection to the network can be a wired connection 106 or wireless connection 108. In one embodiment the NAPA 92 can also include a wireless connection 110 to a stand-alone peripheral 112, thus allowing a peripheral (or several) to be connected at the PPN, but without necessarily being physically proximate the NAPA and not being cable-connected to the NAPA. As will be appreciated, if not physically proximate, the peripheral 112 can have its own power supply. An example of this later configuration is where a peripheral is connected wirelessly to the NAPA and resides at one side of a large room, whereas the NAPA with other peripherals is at another side of the room, or even in another room or on another floor, where cable connection would be inconvenient.

With reference now specifically to FIG. 10, in another embodiment a NAPA 114 can be embodied within a case 115 with a peripheral device, such as a printer 116. In this example, the printer/NAPA can accommodate one or more additional peripheral devices 118, 118'; by incorporation in the case, or by providing a bay 120 allowing the peripheral to be inserted. In one embodiment the peripheral can be "swappable" so as to be conveniently swapped out as discussed above. Again, a power supply 122 and data connection logic 124 are provided to facilitate implementation of the powered peripheral node. One specific example of this scheme was discussed above in connection with FIGS. 3 and 3A, where the peripheral devices or bay(s) 120 were incorporated in an auxiliary paper tray.

In another embodiment illustrated by FIG. 11 (and also by FIG. 1 as discussed above) the PPN provided by a NAPA 126 is realized when a printer 128 in a printer case 129 is joined with a NAPA module case 130. In this embodiment the printer has, in addition to a standard data connection (in accordance with one or more standard protocols) 132, a data connection 134 that is made when the cases are joined, connecting the printer to the network data connection 136 of the NAPA 126. Likewise the power supply 138 of the printer is incorporated in the NAPA and connected by means of another connection 140 made when the cases are joined. One or more accommodated peripheral devices 142, 143, 144 are thus able to be powered and data connected. Moreover, by expansion of the case 130, or by attachment of one or more additional case module(s) 146 including additional power and data connections 148, 150 respectively (and 148', 150' for additional module(s)) further peripheral(s) 142', 143', 144' can be accommodated.

Figure 12:
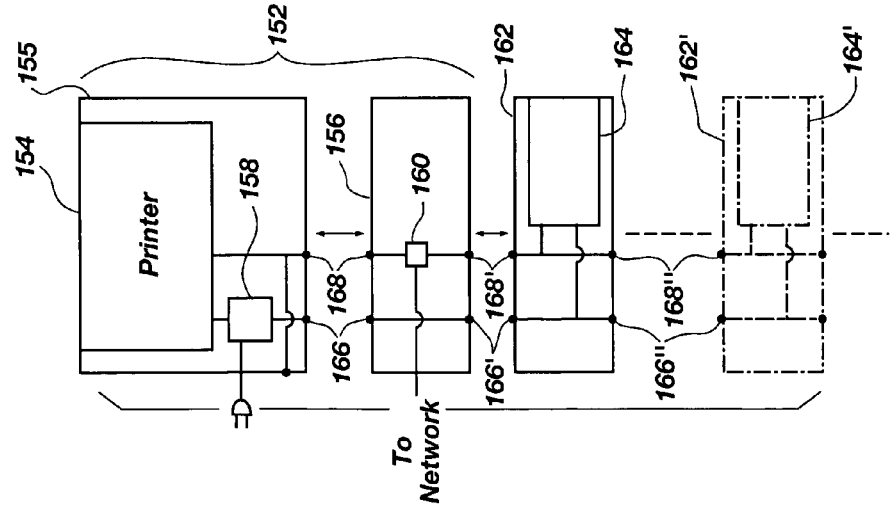
FIG. 12 is a schematic block diagram illustrating a NAPA/PPN in accordance with an embodiment of the invention.

With reference now to FIG. 12, in another embodiment, this just-described expansion functionality is implemented in a modular way by a NAPA 152, comprising a printer 154 in a printer case 155, which is connectable to a NAPA module 156. A power supply 158 and network connection 160 are thereby made available to one or more connectable modules 162, 162', etc., each containing a peripheral device 164, 164', etc. connectors for power and data 166, 168 respectively, are provided as discussed above. An example of the modular concept of this embodiment is also discussed above in connection with FIG. 6.

Figure 14:
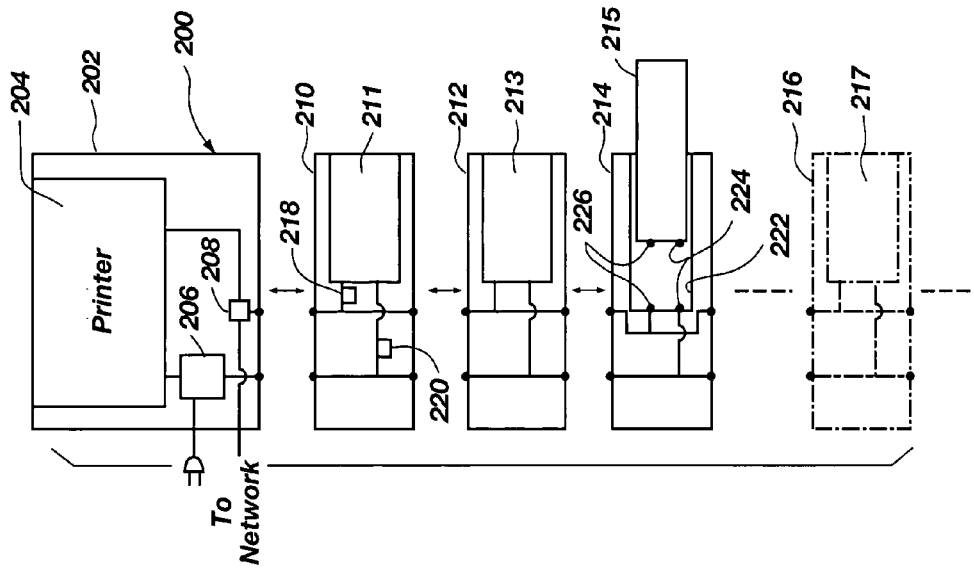
FIG. 14 is a schematic block diagram illustrating a NAPA/PPN in accordance with an embodiment of the invention.
Figure 13:
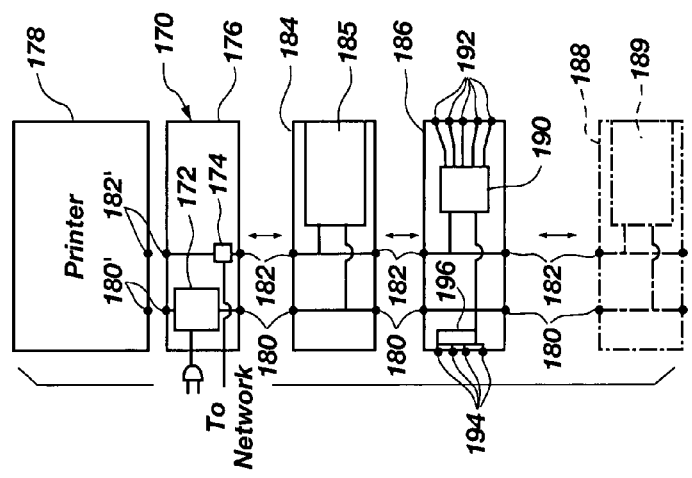
FIG. 13 is a schematic block diagram illustrating a NAPA/PPN in accordance with an embodiment of the invention.

Other examples of the modular implementation enabled by the invention are shown in FIGS. 13 and 14. With particular reference to FIG. 13, a NAPA module 170 comprises a power supply 172, and network data connection logic hardware 174, incorporated in a case 176. The case is connectable to a number of peripheral device modules, for example a printer 178. In one embodiment the printer and the NAPA can be bundled together when sold to a customer, but if a component of either fails only one need be replaced. This is different from the embodiment just discussed above in connection with FIG. 12; for in that example the printer 154 in its case 155 would be joined with the NAPA module 156 to collectively form the NAPA, as the NAPA uses the power supply within the printer case. In the embodiment illustrated in FIG. 13, the NAPA 170 functions independently of the printer 178. The Printer in the embodiment illustrated in FIG. 12 will function alone. However, in the embodiment of FIG. 13, the power supply 172 used by the printer is within the NAPA case 176, and the printer cannot function independent of the NAPA.

Power and data bus connections are made as the modules are connected together as discussed above. This can be by means of contacts, connectors, and other means known in the art. As an example, in one embodiment connectors 180, 182 for power and data can be provided at a uniform location on modules 184, 186, 188. The modules can each incorporate the same or different peripheral devices as those connected adjacent. The modules can be attached in different orders. One, a few, or many modules can be connected, as they are standardized. Likewise, the printer 178 is connected by connections 180', 182' for power and data communication, respectively. For example, the first module 184 can incorporate one of a number of peripheral devices. Examples include media data storage and retrieval drive devices, hard drives, powered data hubs of different protocols, scanners and other image capture devices, etc.

In the illustrated embodiment the second one of the modules, 186, embodies a hub 190, such as a USB or FireWire Hub which may embody further logic, or not, depending on whether it uses a different protocol than the data bus otherwise provided by the NAPA or the network connection 174. Hub connectors 192 enable a plurality of further devices to be data-connected. In one embodiment power connectors 194 can also be provided. If a power supply 196, providing power at different voltages, currents, waveforms, etc. is provided, different connectors having different supply voltages, etc. can be provided. A third module 188 to be connected can contain an entirely different peripheral device 189. Additional modules (not shown) can be added, as can be the case with each of the illustrated modular embodiments.

Turning now to FIG. 14, in another embodiment the NAPA 200 can be incorporated in the same case 202 as a printer 204, and share a common power supply 206. A network connection is enabled by a LAN card or other connection logic hardware 208 provided, which also enables data connection of one or a number of modules 210, 212, 214. Other modules 216 can also be connected as discussed above. This embodiment does have the advantage of providing a network-enabled printer 204, even if no modules are connected. In the illustrated embodiment a data bus 217 using a selected protocol can be provided. Further, a module 210 containing a peripheral 211 using a different protocol or a different supply voltage can incorporate data translation logic hardware 218 and a further power supply 220 to convert the data and power signals passing therethrough to provide compatibility with the standardized signals of the modular approach used. Again in this example, the incorporated peripheral devices 213, 215, 217 in other modules connected, or to be connected, can be any of a number of peripheral devices, depending on what user(s) need at the PPN provided by the NAPA 200. With the modular approach described herein, customization by the consumer is conveniently facilitated.

In the example shown in FIG. 14, one of the modules 214 can incorporate a bay 222 further incorporating connectors 224, 226 for power and data communication, respectively, with a peripheral 215 insertable therein. This module adds further flexibility, as peripherals can be semi-permanently or ephemerally swapped in and out of that module as discussed above. In one example, the bay module 214 can enable connection of a peripheral not otherwise available as pre-packaged in a module 210, 212, 216, etc.

As will be appreciated with reference again to FIG. 6, and indeed all the figures and the foregoing discussion, the NAPA 65, which can be incorporated in the case of the printer 66 and/or one module 67, or 68 or more modules 70,72,74, as described above, or as described in connection with the other embodiments discussed, allows convenient connection of one or more peripherals (e.g. a floppy drive 23, and the other peripheral devices illustrated in FIG. 2) to a network 52 at a PPN established by the appliance. This is without the need for a PC at the connection node, and the NAPA can be a cost-effective alternative to providing such peripherals as zip drives 25, floppy drives 23, CDRW/DVD drives 24, large capacity hard drives 60 and raid arrays, additional data bus connection hubs 40, 42, etc. at a dedicated PC or more than one client-node workstation PC. With implementation of the invention, such exemplary devices can be shared at a PPN accessible by a number of users. Significant savings are possible through reducing the cost of each workstation PC by sharing such peripherals. Moreover, convenient access to the devices without disturbing the work of a user at a host PC is provided. The space savings made possible, with its associated overhead cost, can also be an important consideration.

Thus time and cost savings can be realized over solutions conventionally used for providing shared peripherals. In addition to the particular examples set forth herein, it will be apparent that additional variations and modifications can be implemented within the scope of the invention. Persons skilled in the art, once seeing the examples disclosed, and appreciating the salient principles of the invention, will be able to make numerous changes and modifications which time will not permit to be set forth herein. Therefore these above-set-forth examples will be understood to be provided to help explain and illustrate the invention, but are not to be construed as limiting of the scope of the invention.

What is claimed is:

1. A network-attached peripheral appliance (NAPA), comprising:
    a powered peripheral node (PPN), enabling connection of a plurality of interchangeable peripheral devices to a network at a network node without a computer at said network node, the PPN including:
        a data connection enabling data communication between the NAPA and the network, configured to accommodate data connection of the plurality of peripheral devices at the NAPA;
        a power supply configured to provide power to the plurality of peripheral devices, the PPN enabling use of the plurality of peripheral devices connected to the NAPA by users on on the network; and
        at least one case configured to carry and operatively support the PPN and at least one of the plurality of peripheral devices.

2. A NAPA as set forth in claim 1, wherein the data connection comprises one of
    a) a wired connection; and,
    b) a wireless connection,
between the NAPA and the network.

3. A NAPA as set forth in claim 1, wherein the data connection uses a protocol of a type which is one of: USB; FireWire; Ethernet; Bluetooth; WiFi; SCSI; IDE; Serial; Parallel, and TCP/IP.

4. A NAPA as set forth in claim 1, wherein at least one of the connected peripheral devices is one of: an image output device; an image capture device; a data storage device; a printer; and a data connection hub.

5. A NAPA as set forth in claim 1, wherein one of the peripheral devices comprises a printer, the NAPA being configured to reside within a dimensional footprint of the at lease one case carrying the printer.

6. A NAPA as set forth in claim 5, wherein the NAPA is configured to fit within and use a space otherwise taken by a paper tray of the printer.

7. A NAPA as set forth in claim 5, wherein the NAPA is configured so that the printer can be placed on top of the NAPA.

8. A NAPA as set forth in claim 7, further comprising a connector configured so that the data connection between the printer and the NAPA is made when a bottom of the printer is placed adjacent a top of the NAPA.

9. A NAPA as set forth in claim 1, further comprising a bay configured for receiving at least one of the peripheral devices.

10. A NAPA as set forth in claim 9, further comprising an additional data port configured for connection of one of the peripheral devices.

11. A NAPA as set forth in claim 1, wherein the data connection further comprises a wireless data connection.

12. A NAPA as set forth in claim 1, further comprising a first case portion and second case portion, wherein the first case portion carries the PPN and the second case portion carries at least one of the peripheral devices and is connectable to the first case portion.

13. A NAPA as set forth in claim 12, wherein the at least one peripheral device comprises a printer.

14. A NAPA as set forth in claim 1, wherein the PPN and a printer are carried within the at least one case and share at least a power supply.

15. A NAPA as set forth in claim 14, further comprising at least one additional peripheral device carried in the case with the PPN and the printer.

16. A NAPA as set forth in claim 14, wherein the case includes a bay configured for receiving an additional peripheral device.

17. A NAPA as set forth in claim 1, wherein the NAPA is configured to accommodate attachment of a peripheral module, enabling modular expansion by adding additional peripheral device modules, each containing at least one of the plurality of peripheral devices.

18. A NAPA as set forth in claim 1, further comprising an enabling key, wherein connection of at least one of the plurality of peripheral devices to the appliance is made allowable or discouraged by the key.

19. A NAPA as set forth in claim 18, wherein the key comprises one of an electronic key and a physical compatibility key.

20. A powered peripheral node (PPN) appliance configured for use in a network environment, comprising:
    a network data connection between the appliance and a network;
    a plurality of peripheral data connections, each configured for data connection of an interchangeable peripheral device to the appliance, whereby a plurality of interchangeable peripheral devices can be connected to the appliance and can be in data communication with clients on the network;

a peripheral device power supply connection configured to provide power to the plurality of peripheral devices, at least one peripheral device supply voltage being thereby made available;

a housing configured to carry the power supply connection and at least one of the peripheral data connections, wherein the PPN appliance is configured to cooperate with the network to provide a PPN and enable data communication between the plurality of peripheral devices connected to the appliance and the network without a computer at a location of the PPN.

21. The powered peripheral node appliance of claim 20, wherein the PPN appliance is configured to reside within a dimensional footprint of the housing and to carry a printer.

22. The powered peripheral node appliance of claim 20, wherein one of said data connections is a wireless data connection.

23. The powered peripheral node appliance of claim 20, further comprising a case, wherein the case is configured to be connectable to a case enclosing and operatively supporting one of the plurality of peripheral devices connectable to the PPN appliance.

24. A powered peripheral node (PPN) appliance, comprising:
    a housing;
    a power supply carried within the housing;
    a network data connection enabling data communication between the appliance and the network;
    a plurality of peripheral data connections, each being configured for connection of at least one of a plurality of interchangeable peripheral devices with the network via the network data connection;
    the plurality of connected interchangeable peripheral devices thus being able to be powered by the power supply and to be in data communication with clients on the network via the PPN appliance.

25. A method for providing network access to a plurality of peripheral devices via a powered peripheral node (PPN) on a network, comprising the steps of:
    providing a PPN appliance, including configuring the PPN appliance with a capability for enabling provision of a network address for connected peripheral devices, and a capability for data communication between the network and the connected peripheral devices;
    enabling connection of a plurality of interchanneable peripheral devices to a network at a PPN, via the PPN appliance at a network address, and without need for a computer workstation at the PPN appliance location, said enabling step including enabling connection of a plurality of interchangeable peripheral devices other than a plurality of devices consisting of a combination of only a printer and a scanner; and,
    enabling power supply at the PPN providing a compatible power supply to said plurality of peripheral devices via the PPN appliance;
    whereby a plurality of peripheral devices can be accessed at a network address provided at the PPN, and the plurality of peripheral devices can be conveniently located at a location without need for providing a computer workstation at that location.

26. The method of claim 25, wherein the step of providing a PPN appliance includes configuring the PPN appliance with (i) a capability for having the network address and (ii) a capability for data communication between the network and the plurality of peripheral devices, and further comprising the step of providing for data translation, so that communication between the PPN appliance and at least one of the plurality of peripheral devices is performed by use of a different communications protocol than that used to provide a data communication capability between the PPN appliance and the network.

27. The method of claim 25, further comprising the step of housing the PPN appliance within a case and with a printer, and wherein data communication between the printer, as one of said plurality of peripheral devices, and the network is enabled.

28. The method of claim 25, further comprising the step of enabling location of at least two of said plurality of peripheral devices within a single case also carrying the PPN appliance.

29. A method for providing network access to a plurality of peripheral devices via a powered peripheral node (PPN) on a network, comprising the steps of:
    providing a PPN appliance, including configuring the PPN appliance with a capability for enabling provision of a network address for connected peripheral devices, and a capability for data communication between the network and the plurality of connected peripheral devices;
    enabling connection of a plurality of peripheral devices to a network at a PPN, via the PPN appliance at a network address, and without need for a computer workstation at the PPN appliance location;
    enabling power supply at the PPN providing a compatible power supply to said plurality of peripheral devices via the PPN appliance; and,
    providing for data translation, so that communication between the PPN appliance and at least one of the plurality of peripheral devices is performed by use of a different communications protocol than that used to provide a data communication capability between the PPN appliance and the network;
    whereby a plurality of peripheral devices can be accessed at a network address provided at the PPN, and the plurality of peripheral devices can be conveniently located at a location without need for providing a computer workstation at that location.

30. A network-attached peripheral appliance (NAPA), comprising:
    a powered peripheral node (PPN), enabling connection of a plurality of peripheral devices to a network at a network node without a computer at said network node, the PPN including:
        a data connection enabling data communication between the NAPA and the network configured to accommodate data connection of the plurality of peripheral devices at the NAPA;
        a power supply configured to provide power to the plurality of peripheral devices, one of the peripheral devices comprising a printer, the PPN enabling use of the plurality of peripheral devices connected to the NAPA by users on the network;
    at least one case configured to carry and operatively support the PPN and at least one of the plurality of peripheral devices, wherein the NAPA is configured to reside within a dimensional footprint of the at lease one case and configured so that the printer can be placed on top of the NAPA; and a connector configured so that the data connection between the printer and the NAPA is made when a bottom of the printer is placed adjacent a top of the NAPA.

31. A network-attached peripheral appliance (NAPA), comprising:

a powered peripheral node (PPN), enabling connection of a plurality of peripheral devices to a network at a network node without a computer at said network node, the PPN including:

a data connection enabling data communication between the NAPA and the network, configured to accommodate data connection of the plurality of peripheral devices at the NAPA;

a power supply configured to provide power to the plurality of peripheral devices, the PPN enabling use of the plurality of peripheral devices connected to the NAPA by users on the network; and at least one case configured to carry and operatively support the PPN and at least one of the plurality of peripheral devices, wherein the NAPA is configured to accommodate attachment of a peripheral module, enabling modular expansion by adding additional peripheral device modules, each containing at least one of the plurality of peripheral devices.

* * * * *